United States Patent
Chakra et al.

(10) Patent No.: US 10,585,737 B2
(45) Date of Patent: Mar. 10, 2020

(54) DYNAMIC COGNITIVE ISSUE ARCHIVING AND RESOLUTION INSIGHT

(71) Applicant: International Business Machines Corporation, Armonk, NY (US)

(72) Inventors: Al Chakra, Apex, NC (US); Michael P. Clarke, Ellenbrook (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 15/445,088

(22) Filed: Feb. 28, 2017

(65) Prior Publication Data

US 2018/0246779 A1    Aug. 30, 2018

(51) Int. Cl.

| G06F 11/00 | (2006.01) |
|---|---|
| G06F 11/07 | (2006.01) |
| G06F 16/22 | (2019.01) |
| G06F 21/57 | (2013.01) |
| G06F 21/78 | (2013.01) |
| G06F 11/30 | (2006.01) |

(52) U.S. Cl.
CPC ........ *G06F 11/0787* (2013.01); *G06F 11/079* (2013.01); *G06F 11/0709* (2013.01); *G06F 11/0793* (2013.01); *G06F 11/3072* (2013.01); *G06F 11/3075* (2013.01); *G06F 11/3082* (2013.01); *G06F 16/22* (2019.01); *G06F 21/577* (2013.01); *G06F 21/78* (2013.01); *G06F 2221/034* (2013.01)

(58) Field of Classification Search
CPC ............... G06F 11/0787; G06F 11/079; G06F 11/3072; G06F 11/3075; G06F 11/3082; G06F 17/30312
See application file for complete search history.

(56) References Cited

U.S. PATENT DOCUMENTS

| 5,528,516 | A | * | 6/1996 | Yemini | G06F 11/2257 |
|---|---|---|---|---|---|
| | | | | | 702/181 |
| 5,740,354 | A | * | 4/1998 | Ben-Natan | G06F 11/0718 |
| | | | | | 714/45 |
| 9,317,829 | B2 | * | 4/2016 | Anand | G06Q 10/0635 |
| 2006/0143515 | A1 | * | 6/2006 | Kuramkote | G06F 11/366 |
| | | | | | 714/15 |
| 2008/0133288 | A1 | * | 6/2008 | Thibaux | G06Q 10/04 |
| | | | | | 714/26 |

(Continued)

FOREIGN PATENT DOCUMENTS

WO      2006106502 A2     10/2006

OTHER PUBLICATIONS

List of IBM Patents or Patent Applications Treated as Related; (Appendix P), Filed Mar. 23, 2017; 2 pages.

(Continued)

*Primary Examiner* — Philip Guyton
(74) *Attorney, Agent, or Firm* — Cantor Colburn LLP; Teddi Maranzano

(57) ABSTRACT

A system and method of obtaining an abstracted issue from a problem associated with a system include receiving a problem report. The problem report includes one or more symptoms of the problem. The method also includes deleting at least an identifier of the problem in the problem description to generate the abstracted issue, and storing the abstracted issue in a searchable database.

17 Claims, 4 Drawing Sheets

(56) References Cited

U.S. PATENT DOCUMENTS

| | | | | |
|---|---|---|---|---|
| 2012/0096318 A1* | 4/2012 | Kaiser | .................. | G06F 11/0718 |
| | | | | 714/38.1 |
| 2014/0019814 A1* | 1/2014 | McNairy | ............. | G06F 11/2215 |
| | | | | 714/49 |
| 2014/0122932 A1* | 5/2014 | Chen | ................... | G06F 11/0706 |
| | | | | 714/37 |
| 2016/0358099 A1 | 12/2016 | Sturlaugson et al. | | |
| 2016/0364283 A1* | 12/2016 | Baron | ................... | G06F 11/079 |
| 2016/0364647 A1 | 12/2016 | Achin et al. | | |
| 2018/0246779 A1* | 8/2018 | Chakra | ............. | G06F 17/30312 |
| 2018/0247210 A1* | 8/2018 | Chakra | ................. | G06N 3/126 |
| 2018/0247211 A1* | 8/2018 | Chakra | ................. | G06N 5/043 |

OTHER PUBLICATIONS

Al Chakra et al., "Dynamic Cognitive Issue Archiving and Resolution Insight", U.S. Appl. No. 15/445,046, filed Feb. 28, 2017.
Al Chakra et al., "Dynamic Cognitive Issue Archiving and Resolution Insight", U.S. Appl. No. 15/445,120, filed Feb. 28, 2017.
AppDynamics, "IT Operations analytics redefined: uncovering business impact and opportunities with Application Analytics" An AppDynamics Business White Paper, 2014, pp. 1-10.
Smith, Larry "Analytics Driven IT Operations Management", IBM Corporation, Apr. 2016, pp. 1-30.

* cited by examiner

DYNAMIC COGNITIVE ISSUE ARCHIVING AND RESOLUTION INSIGHT

BACKGROUND

The present invention relates to a cognitive analytics engine, and more specifically, to dynamic cognitive issue archiving and resolution insight.

Analytics refers to the systematic analysis of data and is increasingly used in a variety of areas to discern patterns and gain insight into actions suggested by those patterns. For example, analytics are increasingly used in the management of computer systems to analyze and address issues arising in memory and other operational areas. In this context, analytics engine is a term that refers to the implementation of analysis tools that receive information to facilitate the management of computer systems.

SUMMARY

According to an embodiment of the present invention, a computer-implemented method of obtaining an abstracted issue from a problem associated with a system includes receiving a problem report. The problem report includes one or more symptoms of the problem. The method also includes deleting at least an identifier of the problem in the problem description to generate the abstracted issue. The abstracted issue is stored in a searchable database.

According to another embodiment, a system includes a processor receives a problem report that includes one or more symptoms of the problem and deletes at least at identifier of the problem in the problem description to generate the abstracted issue. A memory device stores the abstracted issue in a searchable database.

According to yet another embodiment, a computer program product performs obtaining an abstracted issue from a problem associated with a system. The computer program product includes a computer readable storage medium having program instructions embodied therewith, the program instructions are executable by a processor to perform a method. The method includes receiving a problem report. The problem report includes one or more symptoms of the problem. The method also includes deleting at least an identifier of the problem in the problem description to generate the abstracted issue and storing the abstracted issue in a searchable database.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
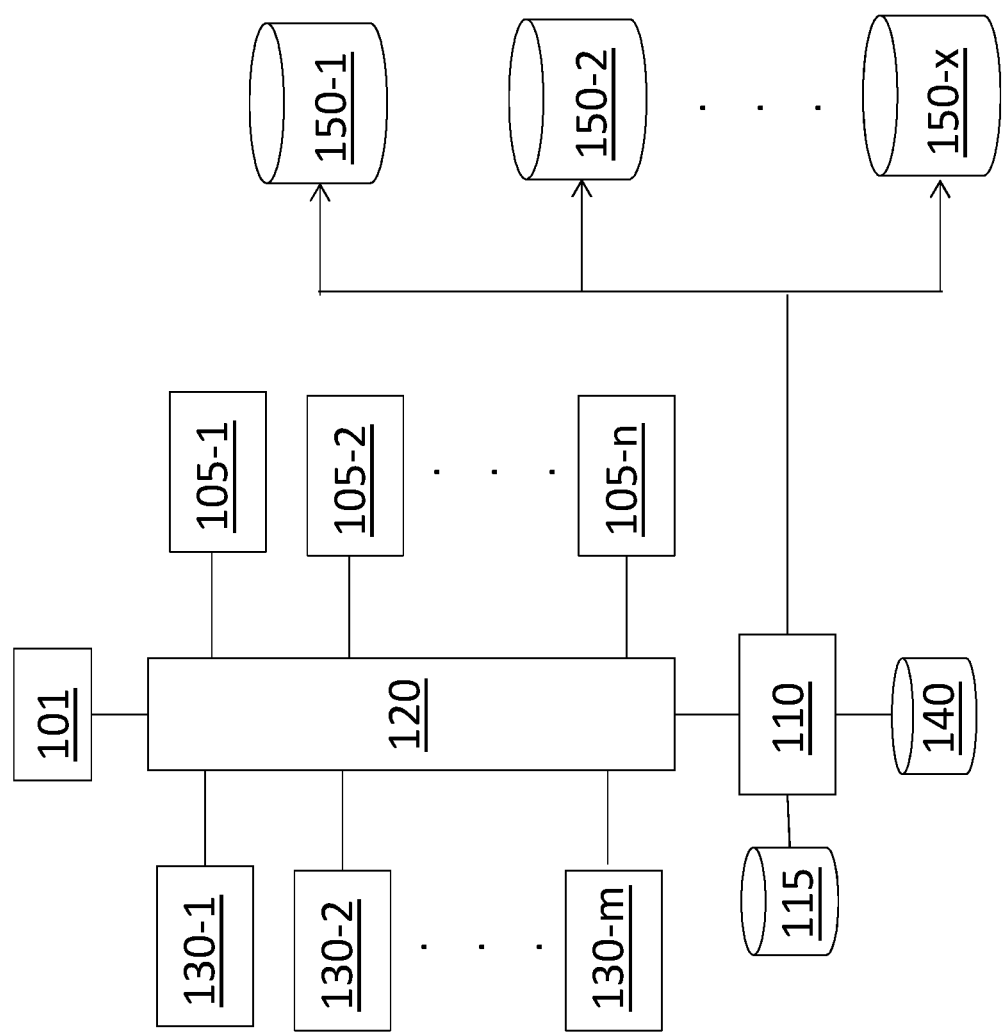
FIG. 1 is a block diagram of the architecture that includes the analytics engine controller according to one or more embodiments.

As previously noted, one implementation of analytics engines involves receiving information and performing analytics to facilitate management of computer systems. For example, in a data center, one or more analytics engines monitor information technology (IT) operations and can give insight to customers regarding potential hacking based on a threshold number of invalid password attempts being exceeded or a potential for a database running out of memory based on monitoring usage, for example. Analytics engines can also provide fixes or information related to fixes for problems that arise in the computer systems. In prior analytics engines, the problems that can be addressed and the insight that can be offered based on the information analytics is limited, because only previously encountered specific issues are recognized and the previous solution is suggested.

Turning now to an overview of the present invention, the several embodiments detailed herein pertain to an analytics engine controller. The analytics engine controller is an analytics engine that communicates with the one or more analytics engines that manage a cluster of computers. The analytics engine controller stores problems and corresponding solutions for future reference. The analytics engine controller correlates related problems to generate combination problems. Individual and correlated problems are abstracted by the analytics engine controller in order to generalize the specific previous problem and facilitate matching future problems with the abstracted issues. The problems and abstracted issues can be shared by the analytics engine controller at different levels.

One or more embodiments of the systems and methods detailed herein relate to recognizing interrelated issues. The analytics engine controller hypothesizes a correlation between two or more problems. Upon subsequent resolution of the problems, if the hypothesis is verified, a new problem is generated as a combination of the two or more problems for subsequent search. The identification of correlated problems can improve insight generation. While hypothesizing and verifying correlations among problems related to the management of a cluster of computer systems is discussed specifically for explanatory purposes, the analytics engine controller according to the one or more embodiments described herein can be applied in any area to find correlations among problems and events.

Additional embodiments of the systems and methods detailed herein relate to abstracting issues. Previously encountered problems are generalized or abstracted by the analytics engine controller such that they can be identified based on subsequent symptoms even when those symptoms are not identical to ones that were previously encountered. A searchable archive of abstracted issues is generated. The archive can be organized into different levels such that a hierarchy of search is established for searching subsequent symptoms to identify an issue. The search facilitates failure prediction and insight generation for issue resolution.

Further embodiments of the systems and methods detailed herein relate to the analytics engine controller determining whether and with whom to share abstracted issues. Different hierarchical levels are defined for the different sharing partners (e.g., other systems of the same enterprise as that of the analytics engine controller, global database). A variety of considerations such as contracts, service agreements, and confidentiality agreements can be used to make a determination of which abstracted issues can be shared and at which hierarchical levels.

FIG. 1 is a block diagram of the architecture that includes the analytics engine controller 110 according to one or more embodiments. A cluster of computer systems 130-1 through 130-*m* (generally referred to as 130) communicate over a bus 120 with analytics engines 105-1 through 105-*n* (generally referred to as 105), an operator 101, and the analytics engine controller 110. The analytics engine controller 110 monitors data traffic on the bus 120.

When one or more analytics engines 105 declares the presence of one or more problems in one or more computer systems 130, the analytics engine controller 110 searches a local database 115 to determine if the problems or abstracted issues, which are generalized descriptions of the problems that are generated from the problems, have a match in the local database 115. A match can facilitate expedited problem resolution or insight into an impending failure, as further discussed with reference to FIG. 2. Prior to searching the database 115, the analytics engine controller 110 can obtain information about the computer software that is run by the cluster of computer systems 130 from a resource database 140. This information can narrow the search or provide an indication of which matches are most relevant.

The analytics engine controller 110 can hypothesize a correlation among two or more problems and determine a correlation score upon one or more of those problems being resolved. Correlated problems can be addressed in the future as a new, combination problem. The correlation facilitates further insight into problems that would previously have been addressed individually. This correlation process is also further discussed with reference to FIG. 2.

The analytics engine controller 110 can share problems and abstracted issues, along with corresponding solutions, for storage in other databases 150-1 through 150-*x* (generally referred to as 150). The other databases 150 can be associated with different levels sharing. For example, the other database 150-1 can be associated with a different enterprise than the one that operates the cluster of computer systems 130. The other database 150-2 can be a service database associated with organizations that produce software products that are run in the cluster of computer systems 130. The other database 150-*x* can be a shared, public global database. The determination of what to share and with whom is further discussed with reference to FIGS. 2 and 3.

Figure 2:
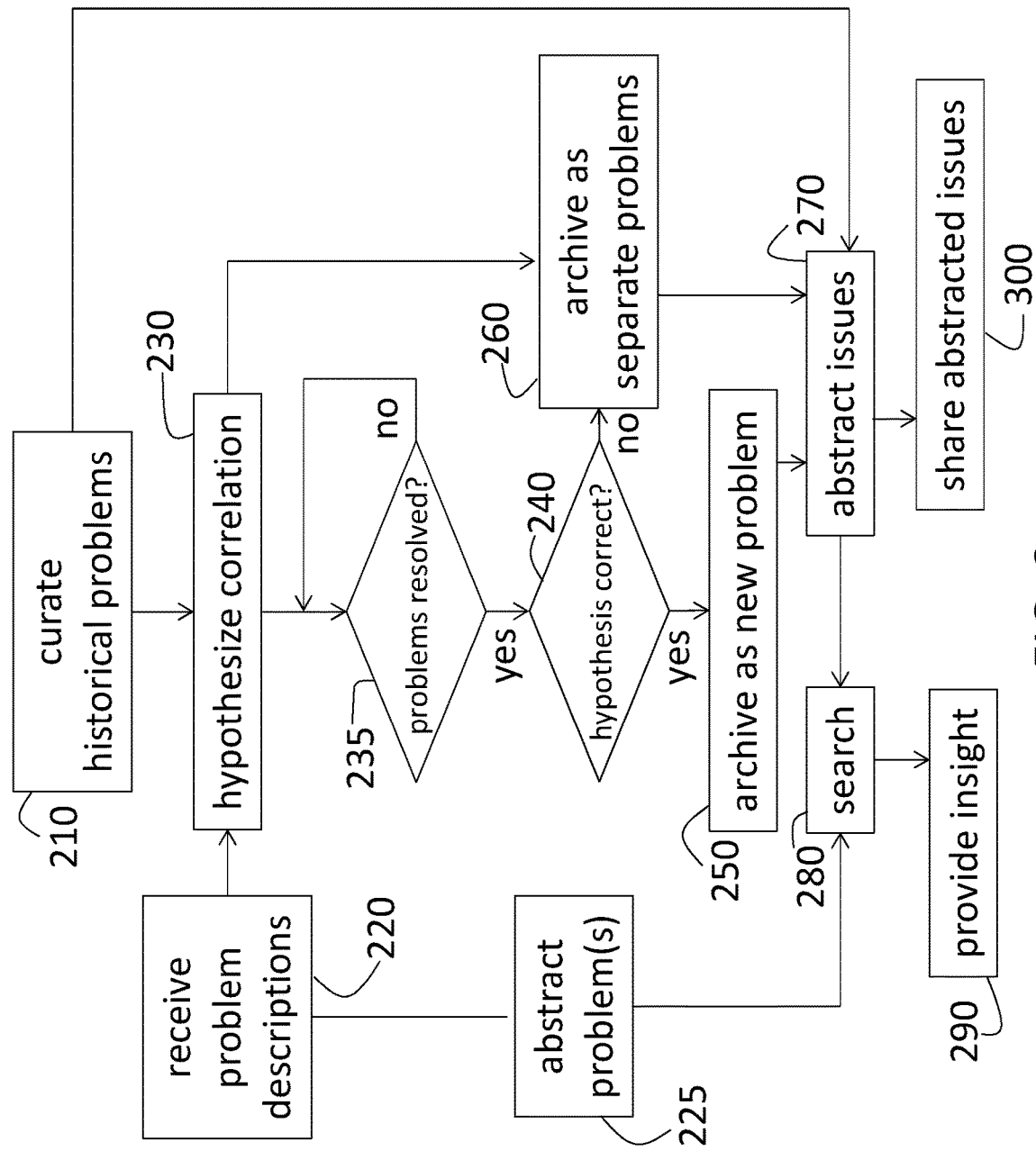
FIG. 2 is a process flow of a method of performing dynamic cognitive issue archiving and resolution insight according to one or more embodiments.

FIG. 2 is a process flow of a method of performing dynamic cognitive issue archiving and resolution insight according to one or more embodiments is shown. The processes shown in FIG. 1 can be performed continuously or periodically. In alternate embodiments, the processes at blocks 220 through 300 can be based on a problem description being received at block 220. The processes are performed by the analytics engine controller 110. As previously noted, the analytics engine controller 110 is an analytics engine itself. Thus, when there is only one analytics engine 105 rather than multiple analytics engines 105, as shown in the exemplary case in FIG. 1, the analytics engine controller 110 can perform the functions discussed herein for both the analytics engine controller 110 and the analytics engine 105.

At block 210, curating historical problems includes identifying previously encountered problems that are discussed in the public sphere. This aspect of the curating can include performing internet searches and obtaining publications using natural language processing, for example. Once relevant information is identified, the curating also includes creating hierarchical and indexed categories of problems. In the exemplary case of the analytics engine controller 110 being involved in the management of a cluster of computer systems 130, the problems can relate to any components (e.g., computer programs, memory managers) and can relate to topics that include hardware, software, operating systems, address spaces, subsystems, jobs, and error codes. When the analytics engine controller 110 relates to another type of management, the problems that are identified and curated can be modified to that type of management. The hierarchical aspect of the categorization of problems relates to indexing problems according to broad categories (e.g., hardware, software) followed by further indexing at a finer granularity (e.g., specific job, error code).

Receiving problem descriptions, at block 220, refers to receiving real-time problem logs rather than historical data. The problem descriptions can be in the form of traffic on the bus 120 that is generated by one of the analytics engines 105. The problem descriptions can be error logs output by one of the computer systems 130 in the cluster being managed by the analytics engine controller 110. At block 230, hypothesizing a correlation includes the analytics engine controller 110 postulating a connection between two or more problems that are reported individually. This hypothesizing can use the curated problems (at block 210), as well as the received problems (block 220). When no hypothesis is generated at block 230, the problem is archived at block 260. That is, for example, a single problem may be reported. In this case, no correlation is possible. Thus, the problem is simply archived (at block 260) and, when a solution is implemented, the solution is stored in correspondence with the problem in the local database 115.

The analytics engine controller 110 can hypothesize a correlation based on several factors in addition to temporal coincidence. Even temporal coincidence alone can suggest a high correlation if it occurs repeatedly and consistently. That is, for example, if two problems occur and are resolved at the same time, each occurrence of the coincidence can raise the correlation score or level associated with the correlation of those two problems. While a single occurrence of a temporal coincidence of the problems can suggest a low level or score of correlation, other factors can suggest a stronger correlation.

For example, when two problems are associated with two computer programs and one of the computer programs is dependent on the other computer program, a hypothesis can be made that the two problems are correlated. In addition to a direct interaction between two or more components (e.g., computer programs, address spaces) that are experiencing a problem, there can be a competition for the same resource among the two or more components that are experiencing a problem. As the examples indicate, the hypothesis of a correlation among problems can require knowledge (e.g., the interaction between components, dependence among components, resources required by each of the components) that is additional to the knowledge included in the problem report. Thus, in order to hypothesize a correlation, the analytics engine controller 110 can obtain additional information from the resource database 140. This information can include the relationship between the sources or locations (e.g., computer programs, memory addresses) of the problems and resources requested by the sources of the problems. The source of a problem is understood to be the computer program, memory address, or other component that is experiencing the problem and which is identified in the problem description.

Depending on the number of problem descriptions that are received (at block 220) and the additional information that is obtained from the resource database 140, more than one hypothesis may be generated at block 230. For example, two problems can exhibit a dependence that leads to a hypothesis of a strong correlation while a third problem can be hypothesized to be weakly correlated with the two problems because it temporally coincides with the occurrence of the two problems.

In the exemplary context of the management of a cluster of computer systems 130, two problems that are unresolved at the same time can relate to two different address spaces. For example, the first address space with address space identifier (ASID) 002C can have a task that is an instance of a message queue (MQ) server issuing a message "CSQ003R," which is outside the set of expected messages. A second address space ASID 013A can have a job associated with the transaction processing software message region issuing messages to the MQ server that is experiencing performance issues. At block 230, a hypothesis can be made regarding the correlation of these two problems based on their temporal coexistence and the fact that the transaction processing software, which is experiencing performance problems, is issuing messages to the MQ server, which is issuing unusual messages. This is an example of a direct interaction among components, the MQ, and the transaction processing software message region, that are experiencing problems that are temporally coincident.

At block 235, a check is done until at least one of the problems that were hypothetically correlated is resolved. At block 240, a check is done of whether the hypothesis is correct. This check involves determining whether the resolution of one of the problems coincides with the other hypothetically correlated problem also being resolved, for example. If a correlation between the two or more problems that are hypothesized to be correlated (at block 230) is verified (at block 240), then the combination of problems is archived as a new problem at block 250. On the other hand, if a correlation is not confirmed (at block 240), then the processes include archiving the problems as separate problems, at block 260.

At block 270, abstracting the issues includes processing the problems that were curated (at block 210), correlated (at block 250), or archived individually (at block 260) according to one or more embodiments. Those problems can be stored in a local database 115 or in a different area of memory accessible to the analytics engine controller 110. The process of abstracting includes generalizing each problem by removing incident-specific information from the error log or other report detailing the problem. Incident-specific information includes the job number, job name, or other identifying information. Abstraction can be performed at different hierarchical levels and abstracted issues can be stored at different hierarchical levels. For example, at one hierarchical level, an abstracted issue can include the type of address space that is experiencing the problem while stripping out the address space identifier (ASID). At another hierarchical level, a more generalized abstracted issue can have the address space information removed, as well.

Table 1 gives examples of problems and their abstractions. Simplified problem records are used to indicate the types of information that can be retained or discarded to achieve abstraction at different levels.

TABLE 1

Exemplary problems and corresponding abstracted issues.

| | Problem | Abstracted Issue |
|---|---|---|
| A1 | Address Space: {jobname: CI35TLXR, ASID: 4567, Type CICS, Subtype: AOR, HasParent: "MQM2T1XR"} Symptoms: ["Multiple Transaction Failures", "Critical Threshold Exceeded"] | Address Space: {Type CICS, Subtype: AOR} Symptoms: ["Multiple Transaction Failures", "Critical Threshold Exceeded"] Action: ["Resolve issue with parent"] Resolution: [Outcome: successful, Time 5 minutes] |
| A2 | Address Space: {jobname: CI35TLXR, ASID: 4567, Type CICS, Subtype: AOR, HasParent: "MQM2T1XR"} Symptoms: ["Multiple Transaction Failures", "Critical Threshold Exceeded"] | Address Space: {Type CICS} Symptoms: ["Multiple Transaction Failures", "Critical Threshold Exceeded"] Action: ["Resolve issue with parent"] Resolution: [Outcome: successful, Time 5 minutes] |
| B | (1) Address Space: {jobname CI35TLXR, ASID: 4567, Type: CICS, Subtype: AOR, HasParent: "MQM2T1XR"} Symptoms: ["Multiple Transaction Failures", "Critical Threshold Exceeded"] (2) Address Space: {jobname: MQM2TLXR, ASID: 5678, Type: MQ, Subtype: QueueManager, HasChild: "CI35TLXR"} Symptoms: ["Unexpected messages", "MQM234E", "Critical Threshold Exceeded"] | (1) Address Space: {Type: CICS, Subtype: AOR, HasParent: {Type: MQ, Subtype QueueManager}} Symptoms: ["Multiple Transaction Failures", "Critical Threshold Exceeded"] (2) Address Space: {Type: MQ, Subtype: QueueManager, HasChild: {Type: CICS, Subtype: AOR}} Symptoms: ["Unexpected messages", "MQM234E", "Critical Threshold Exceeded"] |

TABLE 1-continued

Exemplary problems and corresponding abstracted issues.

| | Problem | Abstracted Issue |
|---|---|---|
| C | Address Space: {jobname: M23RC45X, ASID: 1234} Symptoms: ["unusually high CPU usage", "no IO activity"] Action: ["Monitor for 15 mins", "Cancel"] Resolution: {Outcome: Successful, Time: 16 minutes} | Symptoms: ["unusually high CPU usage", "no IO activity"] Action: ["Monitor for 15 mins", "Cancel"] Resolution: {Outcome: Successful, Time: 16 minutes}, {Outcome: Reoccurred_After_Restart, Time: 7 minutes}, {Outcome: Successful, Time: 16 minutes} |

In Table 1, Rows A1 and A2 show the same problem resulting in two different hierarchical levels of abstracted issues. Row A2 shows a more generalized abstracted issue that does not include the address space subtype. The abstracted issue includes insight which refers to one or more actions taken to resolve the problem along with information about the resolution (e.g., success, length of time to resolve). Row B shows two problems that are correlated. The resulting abstracted issue indicates that the two address spaces involved are related as parent and child. The action and resolution are not shown in row B for simplicity, but the insights associated with the combination of the problems can be included in the local database 115. Row C shows another exemplary problem that is abstracted. Once again, the insight is omitted in Table 1. As row C indicates, the resolution record for the abstracted issue is augmented based on subsequent occurrences of the problem. As Table 1 indicates, an abstracted issue includes the symptoms of the associated problem at a minimum. At different levels of abstraction, the source or location of the symptoms (e.g., address space type) can also be included.

Abstracting the issues, at block 270, includes storing the abstracted issues in the searchable local database 115. As noted, the abstracted issues can be stored at different hierarchical levels of abstraction. As also noted, along with the abstracted issues (at block 270), the non-abstracted problems can also be stored in the local database 115 (at blocks 250 and 260). With some possible exceptions, the problems that are abstracted (at block 270) are resolved. Thus, the resolution is stored in the local database 115 in correspondence with the abstracted issue. This facilitates providing insights at block 290.

When problem descriptions are received (at block 220), abstracting the one or more problems, at block 225, refers to generalizing the problems in the same way that resolved problems are abstracted (at block 170). The received problems can be abstracted to different levels to match the hierarchical levels of abstraction in the local database 115. At block 280, the processes include searching the local database 115. When non-abstracted problems are stored in the local database 115 along with abstracted issues (at block 270), then the received problem descriptions along with the abstracted problems (at block 225) are searched at block 280. The search, at block 180, can yield a likelihood score rather than a yes or no answer. This is because an abstracted problem can match an abstracted issue while the original problem description may not match the non-abstracted problem stored in the local database 115, for example. Further, when different hierarchical levels of abstraction are used, an abstracted received problem can match an abstracted issue at a more generalized level of abstraction (e.g., one that does not include the type of address space) but not at a more detailed level of abstraction.

Thus, abstracted issues and problems in the local database 115 can be ranked according to the extent to which they match an abstracted problem or received problem that was used to generate the abstracted problem. For example, an abstracted problem that matches the received abstracted problem at multiple hierarchical levels will have a higher rank than an abstracted problem that matches the received abstracted problem at only one hierarchical level. A threshold level of the match can be set in order for the processes to include providing insight, at block 290. The analytics engine controller 110 can select the one or more analytics engines 105 to resolve the one or more problems that were matched in the local database 115 and provide the insight (at block 290) to those analytics engines 105 to resolve the problems. The insight can also be provided to the operator 101.

Providing insight, at block 290, refers to providing information to one or more analytic engines 105 about any resolution(s) stored in correspondence with abstracted issues or problems that pass the threshold level of the match as part of the search process (at block 280). When a threshold level of match is not passed, thereby indicating no match in the local database 115, then the abstracted problem can be added to the abstract issues in the local database 115. Optionally, the received problem can be added as a non-abstracted problem, as well. When the problem is resolved, the resolution can be added to the local database 115 in correspondence with the abstracted (and non-abstracted) problem for subsequent search. In addition to building the local database 115, abstracting issues (at block 270) facilitates sharing the abstracted issues at block 300, as further discussed with reference to FIG. 3.

Figure 3:
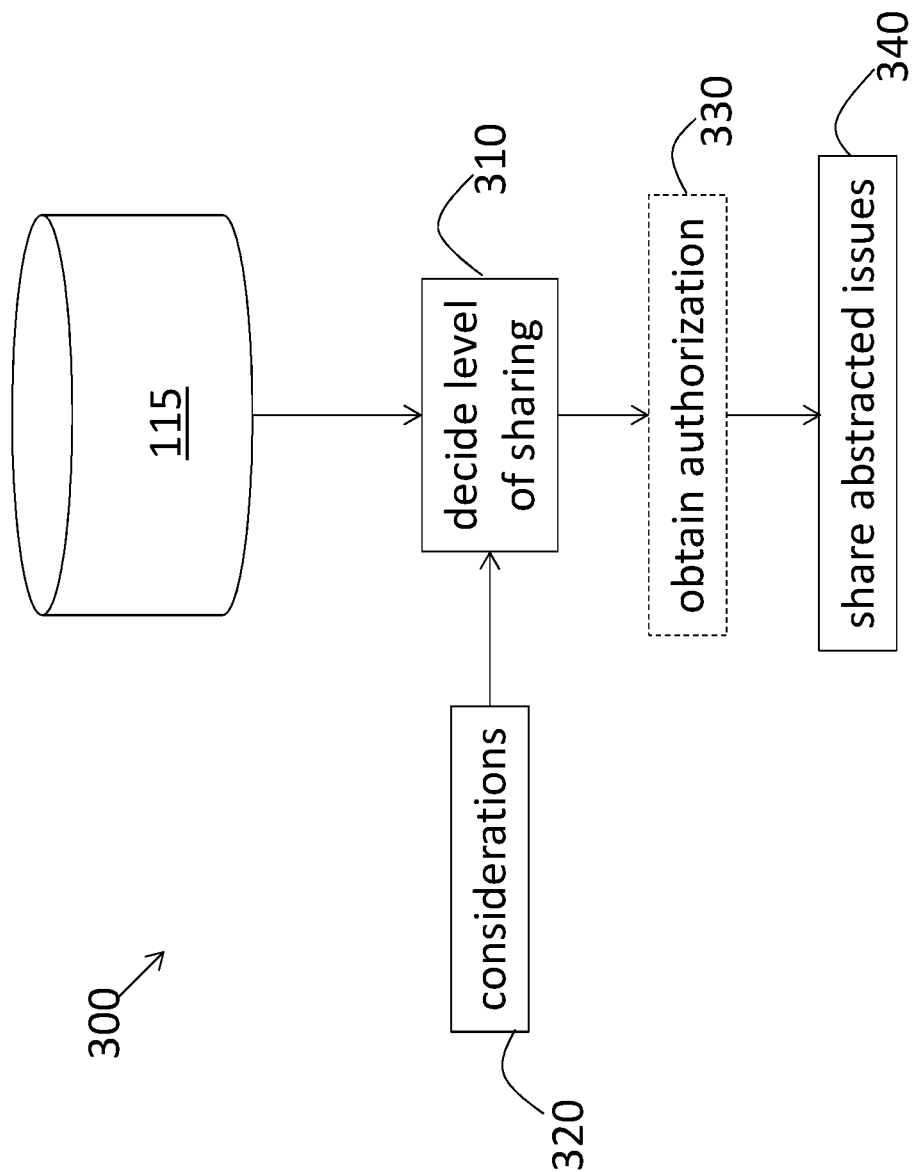
FIG. 3 is a process flow of a method of sharing abstracted issues according to one or more embodiments.

FIG. 3 is a process flow of a method of sharing abstracted issues according to one or more embodiments. When non-abstracted problems are also stored in the local database 115, the processes discussed with reference to FIG. 3 apply, as well, to those problems and corresponding resolutions. Further, the discussion of sharing abstracted issues refers to the sharing of all information associated with the abstracted issues (e.g., solution), as well. The analytics engine controller 110 determines which abstracted issues in the local database 115 can be shared and with whom. For example, the analytics engine controller 110 can be associated with a cluster of computer systems 130 of a banking enterprise. In this case, the other database 150-1 can be associated with another cluster of computer systems 130 within the same enterprise. Another database 150-2 can be associated with a different enterprise in the banking industry. Another database 150-3 can be associated with a publicly available global system, and yet another database 150-4 can be associated with the service provider who develops and manages at least some of the software processed by the cluster of computer systems 130. These different databases 150 represent the different pre-defined levels at which the analytics engine controller 110 can share abstracted issues.

As FIG. 3 indicates, at block 310, deciding the pre-defined levels at which the analytics engine controller 110 will share one or more of the abstracted issues in the local database 115 is based on considerations (at block 320). At block 320, considerations that are applied to each of the pre-defined levels in order to make decisions regarding sharing (at block 310) can include a service level agreement between the enterprise and the analytics engine management company, contract, and confidentiality agreement, for example. There may be issues that, even when abstracted, reveal information about the enterprise or its clients that should not be shared or are not relevant outside the enterprise or the wider community (e.g., banking).

Thus, the decision (at block 310) can be different for each level of sharing. For example, more abstracted issues can be shared with the other database 150-1, which is associated with another cluster of computer systems 130 of the same enterprise in the exemplary case, than with the other database 150-3, which is global and available to the general public in the example discussed above. Obtaining authorization, at block 330, is an optional process that can be added as a stop-gap to ensure that confidential information is not inadvertently revealed outside the enterprise. The authorization can be provided by the operator 101, for example. The authorization can be limited to certain types of abstracted issues in the local database 115 or can be presented in batch form to the operator 101. Sharing abstracted issues, at block 340, is based on the decision (at block 310) and the authorization (at block 330), when relevant.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While an embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
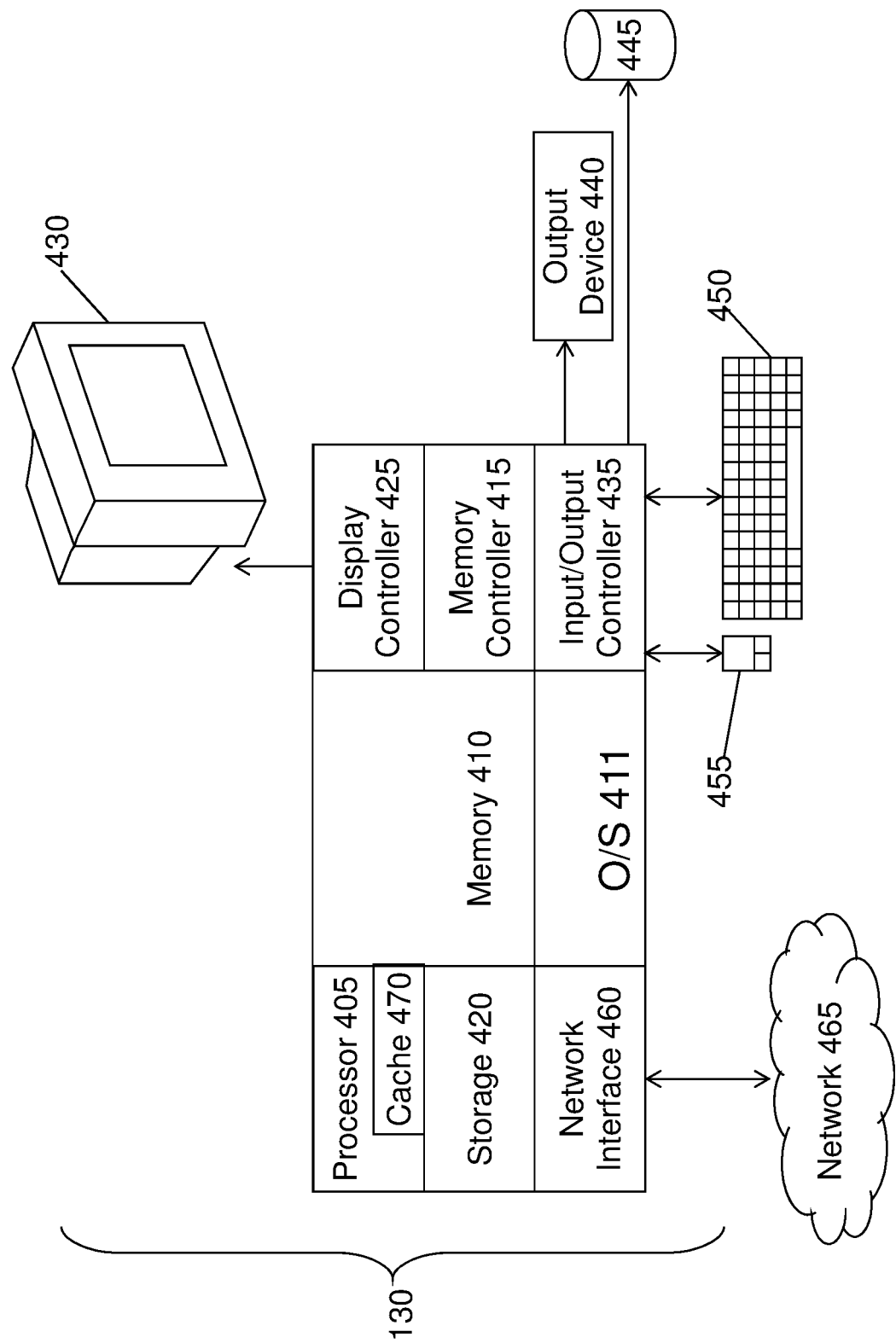
FIG. 4 is a block diagram of an exemplary implementation of a computer system performing the functionality of the analytics engine controller according to one or more embodiments.

The analytics engines 105 and analytics engine controller 110 can be part of one or more of the computer systems 130 that carry out the functionality of the enterprise applications. One or more analytics engines 105 and the analytics engine controller 110 can, instead, be part of a separate computer system 130. In some embodiments, as shown in FIG. 4, the computer system 130 includes a processor 405, memory 410 coupled to a memory controller 415, and one or more input devices 445 and/or output devices 440, such as peripherals, that are communicatively coupled via a local I/O controller 435. The input devices 445 and output devices 440 can facilitate communication with the other databases 150, for example. These devices 440 and 445 can include, for example, a printer, a scanner, a microphone, and the like. Input devices such as a conventional keyboard 450 and mouse 455 can be coupled to the I/O controller 435. The I/O controller 435 can be, for example, one or more buses or other wired or wireless connections, as are known in the art. The I/O controller 435 can have additional elements, which are omitted for simplicity, such as controllers, buffers (caches), drivers, repeaters, and receivers, to enable communications.

The I/O devices 440, 445 can further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 can be a custom made or commercially available processor, a central processing unit (CPU), an auxiliary processor among several processors associated with the computer system 130, a semiconductor based microprocessor (in the form of a microchip or chip set), a macroprocessor, or other device for executing instructions. The processor 405 includes a cache 470, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 can be organized as a hierarchy of more cache levels (L1, L2, etc.).

The memory 410 can include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 can incorporate electronic, magnetic, optical, or other types of storage media. Note that the memory 410 can have a distributed architecture, where various components are situated remote from one another but can be accessed by the processor 405.

The instructions in memory 410 can include one or more separate programs, each of which comprises an ordered listing of executable instructions for implementing logical functions. In the example of FIG. 4, the instructions in the memory 410 include a suitable operating system (OS) 411. The operating system 411 essentially can control the execution of other computer programs and provides scheduling, input-output control, file and data management, memory management, and communication control and related services.

Additional data, including, for example, instructions for the processor 405 or other retrievable information, can be stored in storage 420, which can be a storage device such as a hard disk drive or solid state drive. The stored instructions in memory 410 or in storage 420 can include those enabling the processor to execute one or more aspects of the analytics engine controller 110 and methods of this detailed description.

The computer system 130 can further include a display controller 425 coupled to a monitor 430. In some embodiments, the computer system 130 can further include a network interface 460 for coupling to a network 465. The network 465 can be an IP-based network for communication between the computer system 130 and an external server, client and the like via a broadband connection. The network 465 transmits and receives data between the computer system 130 and external systems. In some embodiments, the network 465 can be a managed IP network administered by a service provider. The network 465 can be implemented in a wireless fashion, e.g., using wireless protocols and technologies, such as WiFi, WiMax, etc. The network 465 can also be a packet-switched network such as a local area network, wide area network, metropolitan area network, the Internet, or other similar type of network environment. The network 465 can be a fixed wireless network, a wireless local area network (LAN), a wireless wide area network (WAN) a personal area network (PAN), a virtual private network (VPN), intranet or other suitable network system and can include equipment for receiving and transmitting signals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of obtaining an abstracted issue from a problem associated with a system, the method comprising:
   hypothesizing a correlation between a first problem and a second problem;
   confirming the correlation based on resolution of the first problem or the second problem coinciding with resolution, respectively, of the second problem or the first problem; and
   generating a combination problem report of the first problem and the second problem based on the confirming the correlation;
   receiving a problem report, wherein the problem report includes one or more symptoms of the problem, the problem report including the combination problem report;
   deleting, using a processor, at least an identifier of the problem in the problem description to generate the abstracted issue; and
   storing the abstracted issue in a searchable database, wherein the combination problem report includes more of the symptoms than a problem report associated with either the first problem or the second problem alone, the storing the abstracted issue includes deleting at least the identifier of the first problem and the second problem from the combination problem report, and the first problem and the second problem being correlated indicates that the first problem and the second problem are temporally coincident, have an dependence of one on the other, or evidence competition for a same resource.

2. The computer-implemented method according to claim 1, wherein the receiving the problem report includes receiving insight regarding the problem, the insight including an action to resolve the problem.

3. The computer-implemented method according to claim 1, wherein the storing the abstracted issue includes storing two or more abstracted issues for the problem at corresponding two or more hierarchical levels.

4. The computer-implemented method according to claim 3, wherein the receiving the problem report includes receiving a location of the problem, the location including a type of memory.

5. The computer-implemented method according to claim 4, further comprising retaining the location to generate one of the two or more abstracted issues for the problem.

6. The computer-implemented method according to claim 5, further comprising deleting the location to generate another of the two or more abstracted issues for the problem.

7. A system, comprising:
   a processor configured to hypothesize a correlation between a first problem and a second problem, to confirm the correlation based on resolution of the first problem or the second problem coinciding with resolution, respectively, of the second problem or the first problem, to to generate a combination problem report of the first problem and the second problem based on confirming the correlation, to receive a problem report that includes one or more symptoms of the problem and includes the combination problem report, and to delete at least at identifier of the problem in the problem description to generate the abstracted issue; and
   a memory device configured to store the abstracted issue in a searchable database, wherein the combination problem report includes more of the symptoms than a problem report associated with either the first problem or the second problem alone, the processor is further configured to store the abstracted issue by deleting at least the identifier of the first problem and the second problem from the combination problem report, and the first problem and the second problem being correlated indicates that the first problem and the second problem are temporally coincident, have an dependence of one on the other, or evidence competition for a same resource.

8. The system according to claim 7, wherein the problem report includes insight regarding the problem, the insight including an action to resolve the problem.

9. The system according to claim 7, wherein the processor is further configured to store two or more abstracted issues for the problem at corresponding two or more hierarchical levels.

10. The system according to claim 9, wherein the problem report includes a location of the problem and the location includes a type of memory.

11. The system according to claim 10, wherein the processor retains the location to generate one of the two or more abstracted issues for the problem.

12. The system according to claim 11, wherein the processor deletes the location to generate another of the two or more abstracted issues for the problem.

13. A computer program product for obtaining an abstracted issue from a problem associated with a system, the computer program product comprising a computer readable storage medium having program instructions embodied therewith, the program instructions executable by a processor to perform a method comprising:
hypothesizing a correlation between a first problem and a second problem;
confirming the correlation based on resolution of the first problem or the second problem coinciding with resolution, respectively, of the second problem or the first problem; and
generating a combination problem report of the first problem and the second problem based on the confirming the correlation;
receiving a problem report, wherein the problem report includes one or more symptoms of the problem, the problem report including the combination problem report;
deleting at least an identifier of the problem in the problem description to generate the abstracted issue; and
storing the abstracted issue in a searchable database, wherein the combination problem report includes more of the symptoms than a problem report associated with either the first problem or the second problem alone, the storing the abstracted issue includes deleting at least the identifier of the first problem and the second problem from the combination problem report, and the first problem and the second problem being correlated indicates that the first problem and the second problem are temporally coincident, have an dependence of one on the other, or evidence competition for a same resource.

14. The computer program product according to claim 13, wherein the receiving the problem report includes receiving insight regarding the problem, the insight including an action to resolve the problem.

15. The computer program product according to claim 13, wherein the storing the abstracted issue includes storing two or more abstracted issues for the problem at corresponding two or more hierarchical levels.

16. The computer program product according to claim 15, wherein the receiving the problem report includes receiving a location of the problem, the location including a type of memory.

17. The computer program product according to claim 16, further comprising retaining the location to generate one of the two or more abstracted issues for the problem and deleting the location to generate another of the two or more abstracted issues for the problem.

* * * * *